(12) United States Patent
Kim et al.

(10) Patent No.: US 12,487,278 B2
(45) Date of Patent: Dec. 2, 2025

(54) METHODS AND SYSTEMS FOR VERIFYING INTEGRATED CIRCUITS

(71) Applicant: Samsung Electronics Co., Ltd., Suwon-si (KR)

(72) Inventors: Taehwan Kim, Suwon-si (KR); Hyungjung Seo, Suwon-si (KR); Younsik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 18/531,266

(22) Filed: Dec. 6, 2023

(65) Prior Publication Data

US 2024/0337687 A1  Oct. 10, 2024

(30) Foreign Application Priority Data

Apr. 6, 2023 (KR) .................. 10-2023-0045410
Jul. 3, 2023 (KR) .................. 10-2023-0085940

(51) Int. Cl.
*G01R 31/28* (2006.01)

(52) U.S. Cl.
CPC .............................. *G01R 31/2884* (2013.01)

(58) Field of Classification Search
CPC .................................................. G01R 31/2884
USPC .................................... 324/762.01, 537, 500
See application file for complete search history.

(56) References Cited

U.S. PATENT DOCUMENTS

| | | | |
|---|---|---|---|
| 7,454,731 B2 | 11/2008 | Oh et al. | |
| 7,490,307 B2 | 2/2009 | Fomaciari et al. | |
| 8,079,004 B2 | 12/2011 | Soviani et al. | |
| 8,443,328 B2 | 5/2013 | Dartu et al. | |
| 8,631,369 B1 | 1/2014 | Kariat et al. | |
| 9,218,440 B2 | 12/2015 | Mulvaney | |
| 9,798,850 B2 | 10/2017 | Elmendorf et al. | |
| 9,836,562 B2* | 12/2017 | He | G06F 30/398 |
| 11,099,235 B1* | 8/2021 | Chen | G01R 1/0491 |
| 2008/0005710 A1 | 1/2008 | Fomaciari et al. | |
| 2008/0077900 A1 | 3/2008 | Oh et al. | |
| 2010/0281445 A1 | 11/2010 | Soviani et al. | |
| 2011/0307850 A1 | 12/2011 | Dartu et al. | |
| 2015/0331981 A1 | 11/2015 | Mulvaney | |
| 2017/0193152 A1 | 7/2017 | Elmendorf et al. | |
| 2019/0302179 A1* | 10/2019 | Chakrabarty | H01L 23/5252 |

FOREIGN PATENT DOCUMENTS

JP 4587754 B2 9/2010

* cited by examiner

*Primary Examiner* — Giovanni Astacio-Oquendo
(74) *Attorney, Agent, or Firm* — Wolf, Greenfield & Sacks, P.C.

(57) ABSTRACT

A system for verifying an integrated circuit includes a tracing module configured to: trace a specified path based on the specified path on which a timing analysis will be performed among a plurality of signal transfer paths within the integrated circuit and a netlist of the integrated circuit at a transistor level, generate a list of nets listing names of nets in the specified path based on the netlist and information on the specified path, declare design constraints for the specified path based on the list of the nets, and generate parasitic data for the net based on the list of the nets. The system further includes an analysis module configured to perform a timing analysis for the specified path based on the design constraints and the parasitic data.

20 Claims, 15 Drawing Sheets

# Designer Input Starts ######

1. name of run
set RUN_NAME "TRACE_EXAMPLE"

510 —
2. trace back startpoints (=signal endpoints)
set TRACE_FROM "
E1 E2
"

520 —
3. trace back endpoints (=signal startpoints)
set TRACE_TO "
S1 S2 S3
S4
"

530 —
4. exclude pattern
set EXCLUDE_PATTERN "
*rst*
"

540 —
5. latch net
set LATCH_NET "
L2.latch
L4.latch
L6.latch
"

550 —
6. bypass latch net (always on latch)
set BYPASS_LATCH_NET "
L3.latch
"

```
mark_clock_network -force L4.latch
create_generated_clock L4.out -source L6.out
mark_clock_network -force L6.latch
create_generated_clock L6.out -source S4 mark_region ?nets {x_insA.x_ins2.netA x_insA.x_ins2.netB}
...
create_clock net_S4 set_false_path -through ...
```

| | PATH TRACER AND DESIGN CONSTRAINTS GENERATOR | | | | | | FILE GENERATOR | |
|---|---|---|---|---|---|---|---|---|
| | # of Startpoints | # of Through Latches | # of Endpoints | # of Traced Paths | % of Traced Nets | # of SDC Generated | Runtime [s] | % of Transistors | Runtime [s] |
| Case #1 | 23 | 1453 | 454 | 27213 | 0.06% | 107 | 238 | 3.10% | 369 |
| Case #2 | 8664 | 7667 | 32 | 403016 | 0.71% | 354 | 2950 | 18.52% | 863 |
| Case #3 | 648 | 3880 | 33 | 48796 | 0.15% | 271 | 853 | 9.30% | 911 |
| Case #4 | 648 | 8756 | 8704 | 443564 | 0.87% | 273 | 3930 | 27.47% | 977 |
| Case #5 | 472 | 1833 | 65536 | 498812 | 0.66% | 153 | 76176 | 22.71% | 815 |
| Case #6 | 480 | 732 | 12640 | 176527 | 0.29% | 85 | 2741 | 8.24% | 908 |
| Case #7 | 480 | 761 | 3665 | 57392 | 0.24% | 142 | 407 | 8.14% | 893 |
| Case #8 | 480 | 732 | 35 | 12524 | 0.09% | 85 | 335 | 5.45% | 649 |
| | 1410 | 1420 | 1430 | 1440 | 1450 | 1460 | 1470 | 1480 | 1490 |

METHODS AND SYSTEMS FOR VERIFYING INTEGRATED CIRCUITS

This application claims priority to Korean Patent Application No. 10-2023-0045410, filed Apr. 6, 2023, and Korean Patent Application No. 10-2023-0085940, filed Jul. 3, 2023, the entire contents of which are hereby incorporated herein by reference.

BACKGROUND

The present disclosure relates to methods and systems for verifying integrated circuits.

An integrated circuit memory device such as a dynamic random access memory (DRAM), an application specific integrated circuit (ASIC), or the like, goes through various verification processes before being manufactured using fabrication processes. Moreover, a method for finding a timing error(s) within an integrated circuit may include performing a dynamic timing analysis (DTA) and/or a static timing analysis (STA).

A DRAM is typically verified using the dynamic timing analysis (DTA); nonetheless, it is impossible to simulate all cases that may occur within the circuit using an input vector(s). In addition, because a block-level static timing analysis (STA) is typically not possible due to a structure of the DRAM designed at a transistor level and because the entire circuit has to be analyzed at one time, there is typically a problem because the static timing analysis (STA) has a relatively long runtime and it is often difficult to create design constraints required for the static timing analysis (STA) due to the complexity of the circuit, so that a turn-around-time (TAT) becomes longer.

SUMMARY

Embodiments are to provide a method and a system for verifying an integrated circuit, by performing a static timing analysis (STA) only for a specified path of the integrated circuit.

Further embodiments are to provide a method and a system for verifying an integrated circuit that reduce a verification time for timing sign-off.

A system for verifying an integrated circuit according to an embodiment of the present disclosure includes: a tracing module configured to: trace a specified path based on the specified path on which a timing analysis will be performed among a plurality of signal transfer paths within the integrated circuit and a netlist of the integrated circuit at a transistor level, generate a list of nets listing names of nets in the specified path based on the netlist and information on the specified path, declare design constraints for the specified path based on the list of the nets, and generate parasitic data for the net based on the list of the nets. An analysis module is also provided, which is configured to perform a timing analysis for the specified path based on the design constraints and the parasitic data.

The information on the specified path may include information on at least one signal start point and at least one signal end point of the specified path, information on a path to be excluded from tracing among a plurality of signal transfer paths between the at least one signal start point and the at least one signal end point, and information on at least one memory element that the specified path passes through. In addition, the specified path may include a data path connected to a signal start point among the at least one signal start point that outputs a data signal, and a clock path connected to a signal start point among the at least one signal start point that outputs a clock signal. The tracing may include extracting a plurality of paths between the at least one signal start point and the at least one signal end point, and excluding a path to be excluded from the tracing among the extracted plurality of paths. Advantageously, in some embodiments, the tracing may be performed in a reverse direction of a signal transfer direction of the plurality of signal transfer paths. The plurality of paths may be distinguished by the memory element. The memory element may include a first pin that receives the clock signal, and the clock path may include the net connected to the first pin. The design constraints may be declared for the clock path among the specified paths. The parasitic data may further include parasitic data for a net that forms a coupling capacitance with the net, and a net that is logically adjacent to the net. The memory element may include a latch.

According to a further embodiment, a method for verifying an integrated circuit according to an embodiment of the present disclosure may include: receiving a netlist of a transistor-level integrated circuit, receiving information on a specified path on which a timing analysis will be performed among a plurality of signal transfer paths within the integrated circuit, tracing the specified path and generating a list of nets listing names of nets in the specified path based on the netlist and information on the specified path, declaring design constraints for the specified path based on the list of the nets, and generating parasitic data for the net in the specified path based on the list of the nets. The information on the specified path may include a name of a net connected to a plurality of signal start points and a plurality of signal end points in the specified path, a name of a net in a path to be excluded from tracing among a plurality of signal transfer paths between the plurality of signal start points and the plurality of signal end points, and a name of a net connected to a memory element through which the specified path passes. The tracing of the specified path may include: extracting a plurality of path from the plurality of signal end points to the plurality of signal start points, and excluding a path to be excluded from the tracing among the plurality of paths. The plurality of paths may be distinguished by the memory element. The declaring of the design constraints may include extracting a clock path from the plurality of paths. The memory element may include a first pin that receives a clock signal, and the clock path may be a path connected to the first pin. The clock path may be a path connected to a signal start point among the plurality of signal start points that outputs the clock signal. The extracting of the clock path from the plurality of paths may include: extracting at least one net connected to the plurality of signal start points from the list of the nets, extracting the signal start point among the plurality of signal start points that outputs the clock signal, and extracting a path including a net connected to the signal start point outputting the clock signal among the at least one net. The generating of the parasitic data may include: receiving the parasitic data from layout data of the integrated circuit, and extracting the parasitic data of the net in the list of the nets from the parasitic data of the integrated circuit.

A device for verifying an integrated circuit according to an embodiment of the present disclosure includes: a path tracer configured to trace a specified path on which a timing analysis will be performed among a plurality of signal transfer paths within the integrated circuit at a transistor level and generate a list of nets listing names of nets in the specified path, a design constraints generator configured to declare design constraints for the specified path based on the list of the nets, and a file generator configured to generate parasitic data for a net in the list of the nets based on the list of the nets.

BRIEF DESCRIPTION OF THE DRAWINGS

In order to more fully understand drawings cited in a detailed description of the present disclosure, a brief description of each drawing is provided.

FIG. 5 is a view showing an information file of a specified path received by a path tracer according to an embodiment.

FIG. 12 is a view showing a design constraints file generated by a design constraints generator according to an embodiment.

FIG. 14 is data representing results of performing the path tracer, the design constraints generator, and a file generator according to an embodiment.

DETAILED DESCRIPTION OF THE EMBODIMENTS

Figure 1:
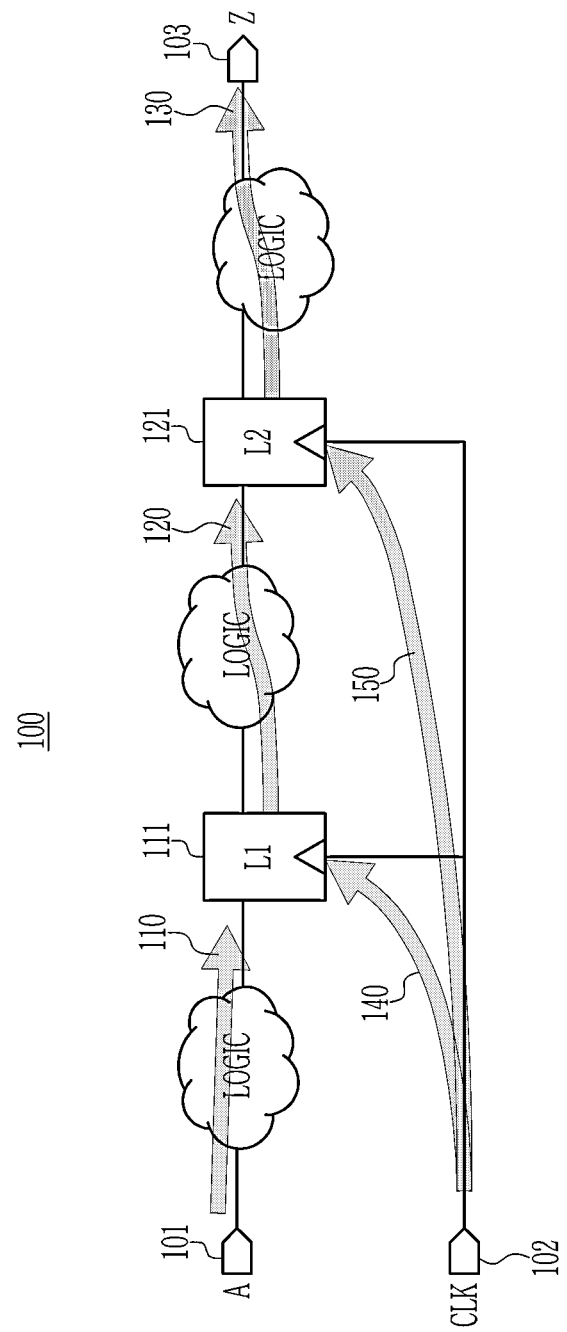
FIG. 1 is a view illustrating a signal transfer path for describing a static timing analysis (STA).

Hereinafter, an embodiment of the present disclosure will be described in detail with reference to the accompanying drawings. The same reference numerals are used for the same constituent elements on the drawings, and duplicate descriptions for the same constituent elements are omitted.

Moreover, in order to clearly explain the present disclosure in the drawings, parts irrelevant to the description are omitted, and similar reference numerals are attached to similar parts throughout the specification. In the flowchart described with reference to the drawings, the order of the operations may be changed, several operations may be merged, certain operations may be divided, and specific operations may be omitted.

A timing analysis of an integrated circuit is essential to ensure that the integrated circuit operates and performs as expected when the integrated circuit is manufactured on silicon. A static timing analysis (STA) of the integrated circuit is an analysis method that considers all timing paths existing in the circuit to find a path that may exhibit an unstable operation. In other words, the static timing analysis (STA) analyzes a timing between signals input/output to/from a designed semiconductor memory or logic to test whether the designed integrated circuit may normally operate without a timing problem(s).

The static timing analysis (STA) is performed by a static timing analysis (STA) tool that analyzes a timing between input and output signals based on delay information and connection relationship information for a cell (e.g., a transistor, a gate-level cell, a unit logic (AND, OR, or the like) level cell, a memory element (e.g., a latch, a flip-flop, or the like)), which is included in the integrated circuit and design constraints of a clock path. A representative tool currently used for the static timing analysis (STA) of an integrated circuit designed at a transistor level is NanoTime, which is a product developed by Synopsys Inc.

FIG. 1 is a view illustrating a signal transfer path for describing the static timing analysis (STA). Referring to FIG. 1, an integrated circuit 100 may include plurality of signal input points 101 and 102 and a signal output point 103. A clock signal may be transmitted from the first signal input point (CLK) 102 among the signal input points 101 and 102 to each of latches 111 and 121. A data signal may be transferred from the second signal input point (A) 101 to the signal output point (Z) 103. Specifically, when the clock signal is input to each of the latches (L1) 111 and (L2) 121 through a first clock path 140 and a second clock path 150, each of the latches 111 and 121 may be activated, and the data signal may be transferred to the latch 111 through a first data path 110, and then transferred to the latch 121 through a second data path 120, and then may be transferred to the signal output point 103 through a third data path 130. In this case, the static timing analysis (STA) may check whether a given design may operate at a specific clock signal frequency without an error that occurs when the signal of each data path 110, 120, or 130 arrives too early or too late than the signal of each clock path 140 or 150.

In other words, the static timing analysis (STA) may break a design down into a timing path(s) to check timing errors for all timing paths. However, unlike an application specific integrated circuit (ASIC) that is designed as a gate-level cell, a dynamic random access memory (DRAM) is designed at a transistor level so that complexity of the circuit further increases. Therefore, when the static timing analysis (STA) for all timing paths is performed on a DRAM, a runtime is long and a clock path is complex so that it is difficult to create design constraints.

Embodiments described in the present disclosure extract a list of nets included in a specified path to be analyzed in a memory semiconductor design, which is designed at a transistor level and extracts a clock path from the extracted list of nets to create design constraints. Thus, the present disclosure is intended to provide a method of performing a static timing analysis (STA) for the specified path. In an embodiment, the specified path to be analyzed may be a path involved in a read operation of a memory semiconductor or a path involved in a write operation of the memory semiconductor, but the present disclosure is not limited thereto.

Figure 2:
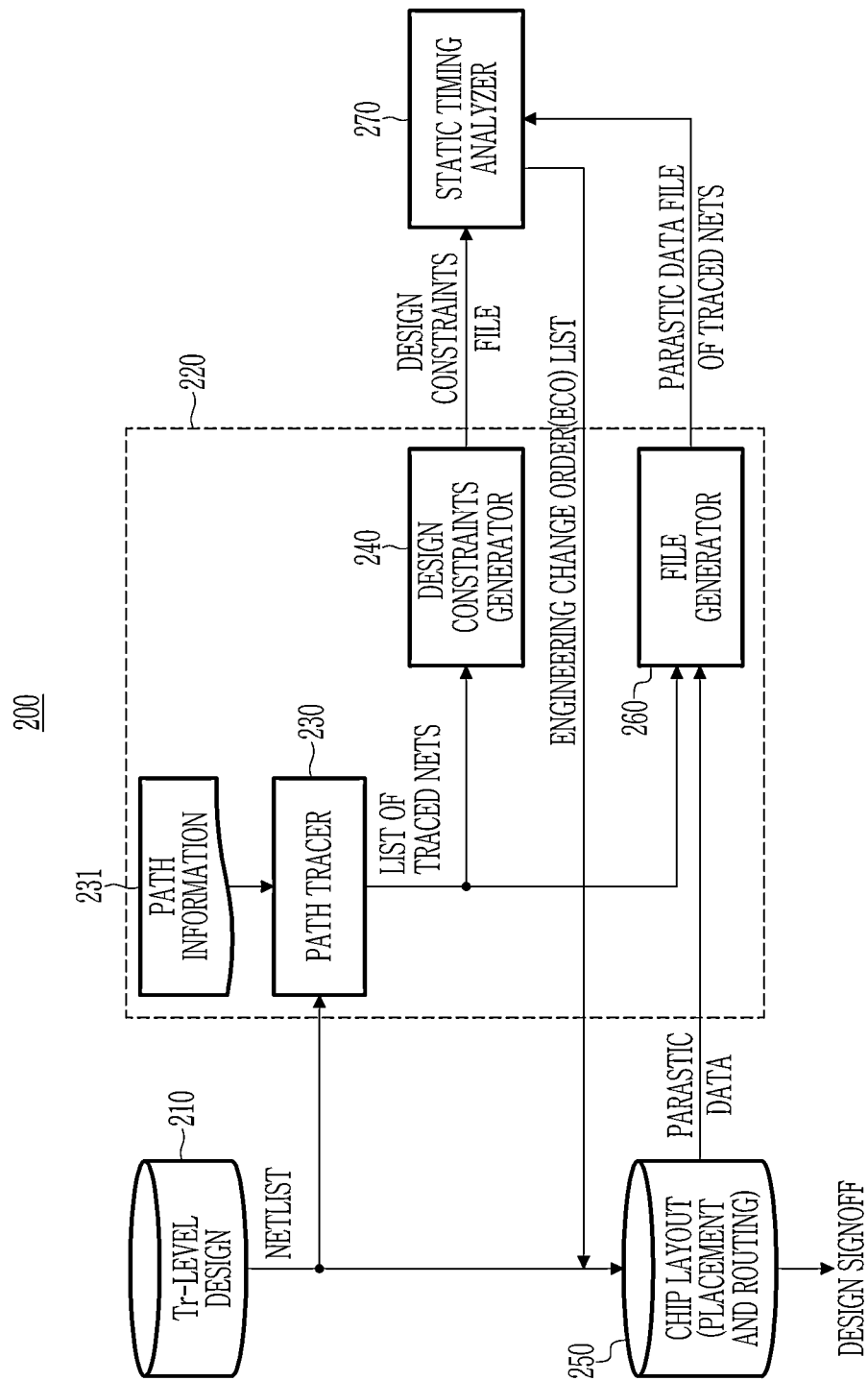
FIG. 2 is an implementation flow of the static timing analysis (STA) according to an embodiment.

FIG. 2 is an implementation flow of the static timing analysis (STA) according to an embodiment. First, a netlist that describes a connection relationship of cells of an integrated circuit may be extracted from a transistor level design 210. The transistor level design may refer to a memory semiconductor design such as a dynamic random access memory (DRAM). In order to perform the static timing analysis (STA) of a specified path to be analyzed in a memory semiconductor design designed at a transistor level, a path tracer 230 may extract a list of nets in the specified path. In order to extract the list of nets in the specified path, the path tracer 230 may further receive path information 231 for the specified path in addition to the netlist. The path information 231 may include information on a start point and an end point of the path, a latch within the path, or the like The path tracer 230 may extract a list of nets listing names of nets in the specified path from the received information. The list of nets in the specified path may be input to a design constraints generator 240 and a file generator 260.

The design constraints generator 240 may generate a design constraints file required to perform the static timing analysis (STA) based on the list of nets received from the path tracer 230. Since the design constraints for performing the static timing analysis (STA) are declared only for the clock path, the design constraints generator 240 may extract the clock path from the specified path and may declare the designs constraint for the extracted clock path.

The file generator 260 may further receive parasitic data from a chip layout 250 in addition to the list of nets received from the path tracer 230. The chip layout 250 may refer to layout data generated by placing and routing cells and nets included in the integrated circuit. The parasitic data may refer to resistor (R) information, capacitor (C) information, and the like of each net included in the integrated circuit. Based on the list of nets received from the path tracer 230, the file generator 260 may extract parasitic data for a net in a specified path on which to perform the static timing analysis (STA) among the parasitic data.

A static timing analyzer 270 may perform the static timing analysis (STA) by receiving the design constraints file and a parasitic data file for the specified path as inputs. If a timing error is found during the timing analysis, the static timing analyzer 270 may generate an engineering change order (ECO) list for correcting the error. The chip layout 250 may be modified based on the ECO list, and then when all timing errors are resolved, timing sign-off for the integrated circuit is completed.

Here, a series of operations 220 for extracting the list of nets included in the specified path and generating the design constraints and the parasitic data from the list of nets may perform the static timing analysis only for the specified path, and instructions for performing each operation of the series of operations may be stored in one program. In an embodiment, the devices 230, 240, and 260 performing the series of operations 220 for extracting the list of nets included in the specified path and generating the design constraints and the parasitic data from the list of nets and the timing analyzer 270 may be referred to as a device for verifying the integrated circuit.

Figure 3:
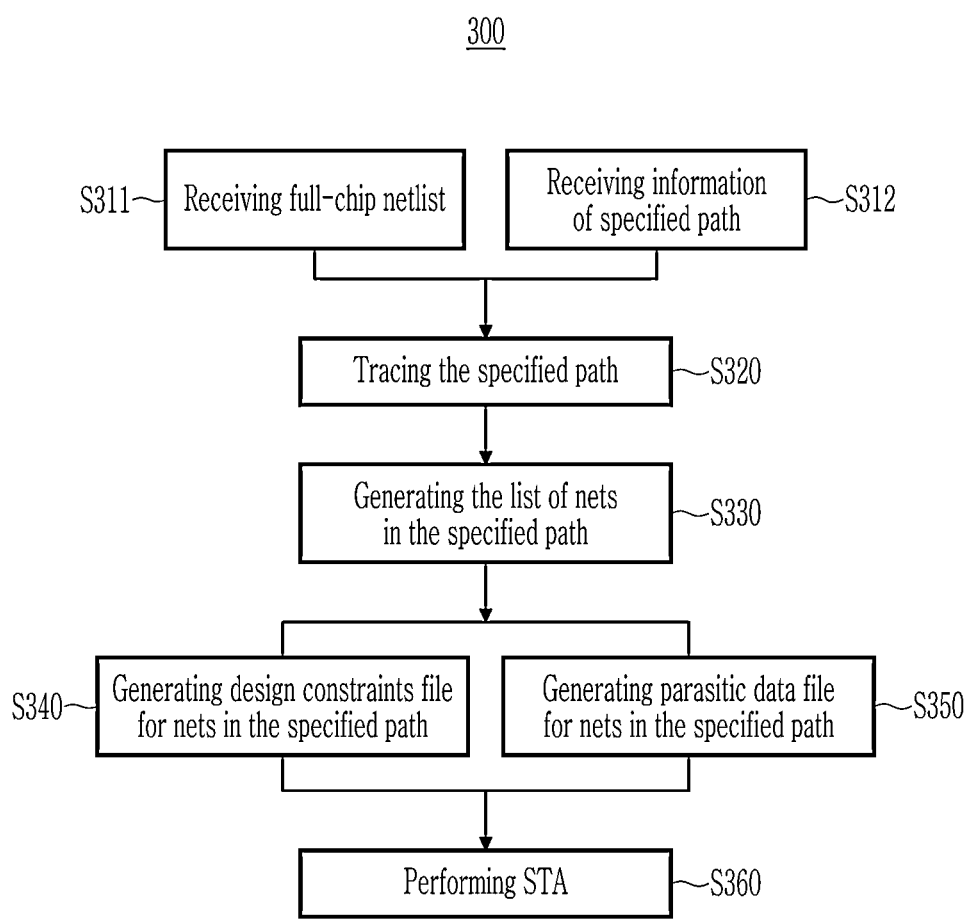
FIG. 3 is a flowchart for performing the static timing analysis (STA) according to an embodiment.

FIGS. 3 to 13 describe a method for performing the static timing analysis (STA) according to an embodiment. In particular, FIG. 3 is a flowchart for performing the static timing analysis (STA) according to an embodiment. Referring to FIG. 3, in step S311, the path tracer 230 of FIG. 2 receives a full-chip netlist of a transistor-level integrated circuit design. In step S312, the path tracer 230 receives information on the specified path. Here, the specified path may be a path for performing the static timing analysis (STA).

Figure 4:
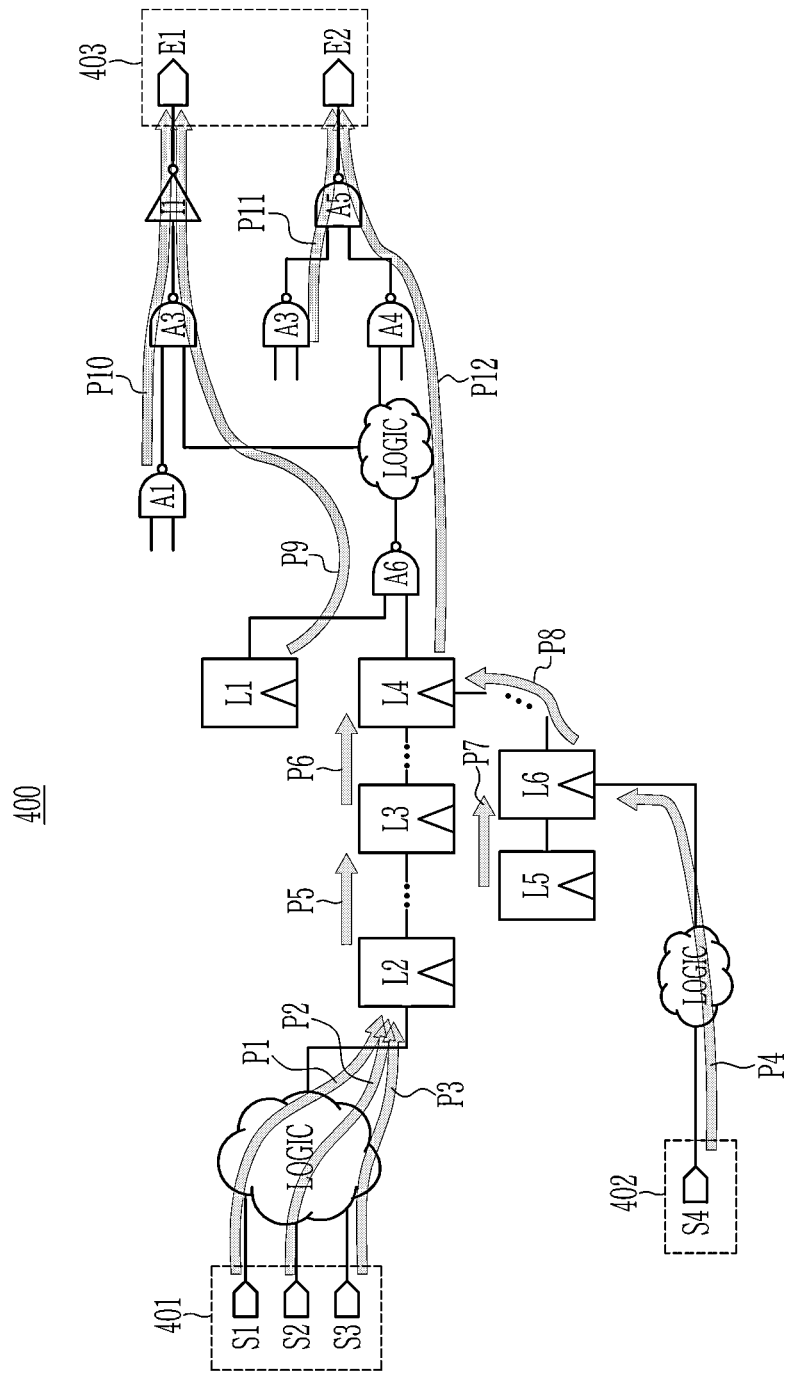
FIG. 4 is a view showing a signal transfer path of an integrated circuit according to an embodiment.

The step S312 will be described with reference to FIGS. 4 and 5. In particular, FIG. 4 is a view showing a signal transfer path of an integrated circuit according to an embodiment, and FIG. 5 is a view showing an information file of a specified path received by a path tracer according to an embodiment. Referring to FIG. 4, the integrated circuit 400 may include a plurality of signal start points (S1, S2, S3, and S4) 401 and 402 and a plurality of signal end points (E1 and E2) 403. Each of the signal start points (S1, S2, and S3) 401 may transfer a data signal, whereas the signal start point 402 may transfer a clock signal, which operates to synchronize the signal transfer path(s). A plurality of paths P1 to P12 may exist between the plurality of signal start points 401 and 402 and the plurality of signal end points 403. In an embodiment, paths starting from the signal start points (S1, S2, and S3) 401 may be data paths, and a path starting from the signal start point (S4) 402 may be a clock path(s).

The static timing analysis (STA) may be performed by breaking a design down into a timing path. Since the latch transfers a data signal based on a clock signal, the timing path may be broken down at each latch. In an embodiment, the timing path may include a first path P1, P2, P3, and P4 from the plurality of signal start points 401 and 402 to the latches, a second path P5, P6, P7, and P8 between the latches, and a third path P9, P10, P11, and P12 from the latches to the plurality of signal end points E1 and E2. Each timing path may include various logics, but may not include a flip-flop, a latch, or the like. As described herein, the timing path is broken down into segments at each latch, but the present disclosure is not limited thereto. For example, in alternative embodiments, the timing path may be broken down into segments at a flip-flop, a register, or the like.

Referring to an information file 500 of the specified path of FIG. 5, in an embodiment, information of the specified path received by the path tracer 230 may include information 510 on the signal end point and information 520 on the signal start point. Since path tracing is performed in a reverse direction relative to the direction in which the data signal and/or the clock signal are transferred, the path tracer 230 may receive information on the signal end point and the signal start point to determine a tracing start point (the signal end point) and a tracing end point (the signal start point).

In an embodiment, the information on the specified path received by the path tracer 230 may include information 530 on a net to be excluded from the path tracing. The path tracer 230 may not perform path tracing for a path after a net (within the path) is excluded from the path tracing during path tracing from the tracing start point to the tracing end point. In this case, information on the net may be input as a specified pattern of a name of the net.

In an embodiment, the information on the specified path received by the path tracer 230 may include information 540 on latches in the specified path. Specifically, the path tracer 230 may receive information on the latch through which a signal passes during the path tracing from the tracing start point to the tracing end point. In an embodiment, the information on the latch may include information on a net connected to the latch. During the path tracing, the path tracer 230 may perform path tracing of the data signal and the clock signal of the latch through which the signal passes.

In another embodiment, the information on the specified path received by the path tracer 230 may include information 550 on the latch in which the clock signal is always on among the latches in the specified path. Specifically, the path tracer 230 may receive information on the latch in which the clock signal is always on among the latches through which the signal passes during the path tracing from the tracing start point to the tracing end point. In an embodiment, the information on the latch in which the clock signal is always on may include information on a net connected to the latch in which the clock signal is always on. The latch in which the clock signal is always on may be referred to as a bypass latch. The path tracer 230 may not perform path tracing of the clock signal of the bypass latch during the path tracing. The information received by the path tracer 230 is not limited thereto, and may further receive information on the specified path required for the path tracing.

Referring again to FIG. 3, in step S320, the path tracer 230 traces a path by receiving information on the full-chip netlist and the specified path, and in step S330, the path tracer 230 generates (or creates) the list of nets included in the specified path. The steps S320 and S330 will be described more fully with reference to FIGS. 6 to 9.

Figure 6:
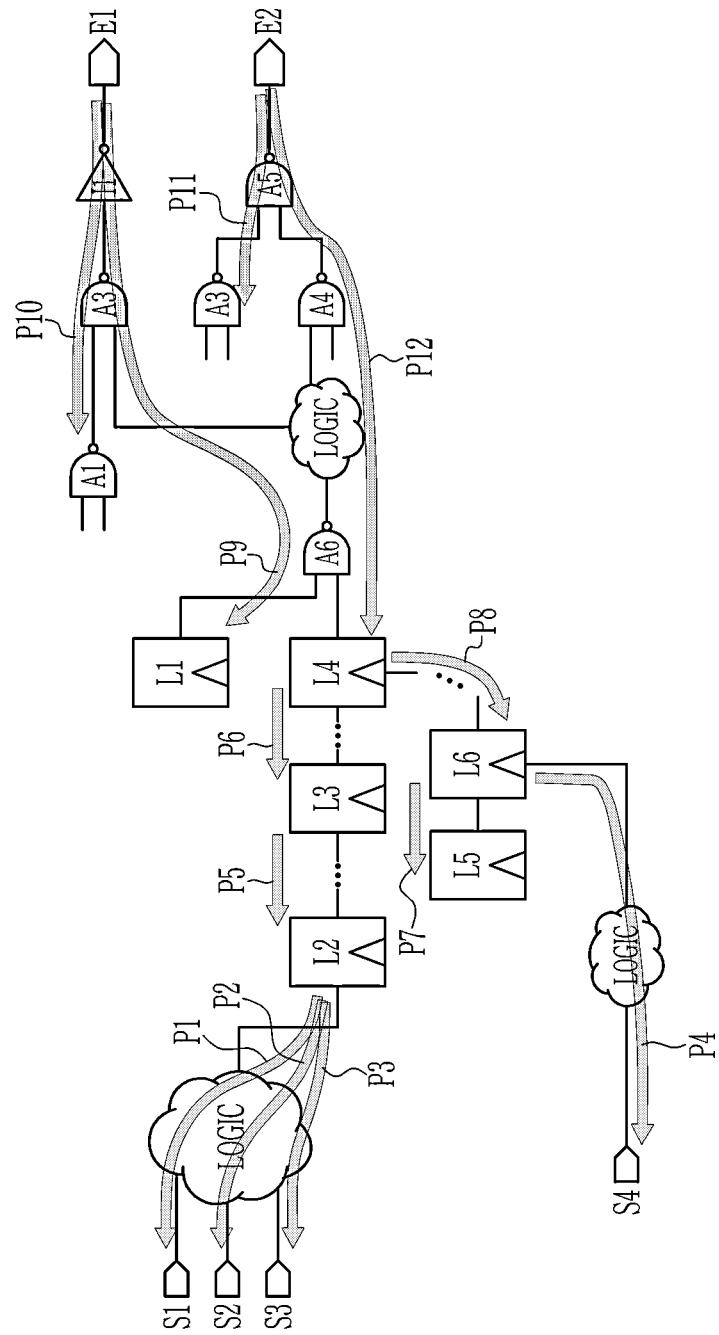
FIG. 6 is a view showing a path within the integrated circuit according to an embodiment.

FIG. 6 is a view showing a path within the integrated circuit according to an embodiment. Specifically, the path within the integrated circuit represents all paths from the tracing start points E1 and E2 to the tracing end points S1, S2, S3, and S4 to be traced by the path tracer 230. Referring to FIG. 6, based on the information 510 on the signal end point and the information 520 on the signal start point of FIG. 5, the path tracer 230 may perform path tracing from the signal end point (that is, the tracing start points E1 and E2) to the signal start point (that is, the tracing end points S1, S2, S3, and S4). In an embodiment, the path may be broken down into the latch. For example, the path may include the paths P9, P10, P11, and P12 from the tracing start points E1 and E2, the paths P5, P6, P7, and P8 between the latches, and the paths P1, P2, P3, and P4 from the latches to the tracing end points S1, S2, S3, and S4.

Figure 7:
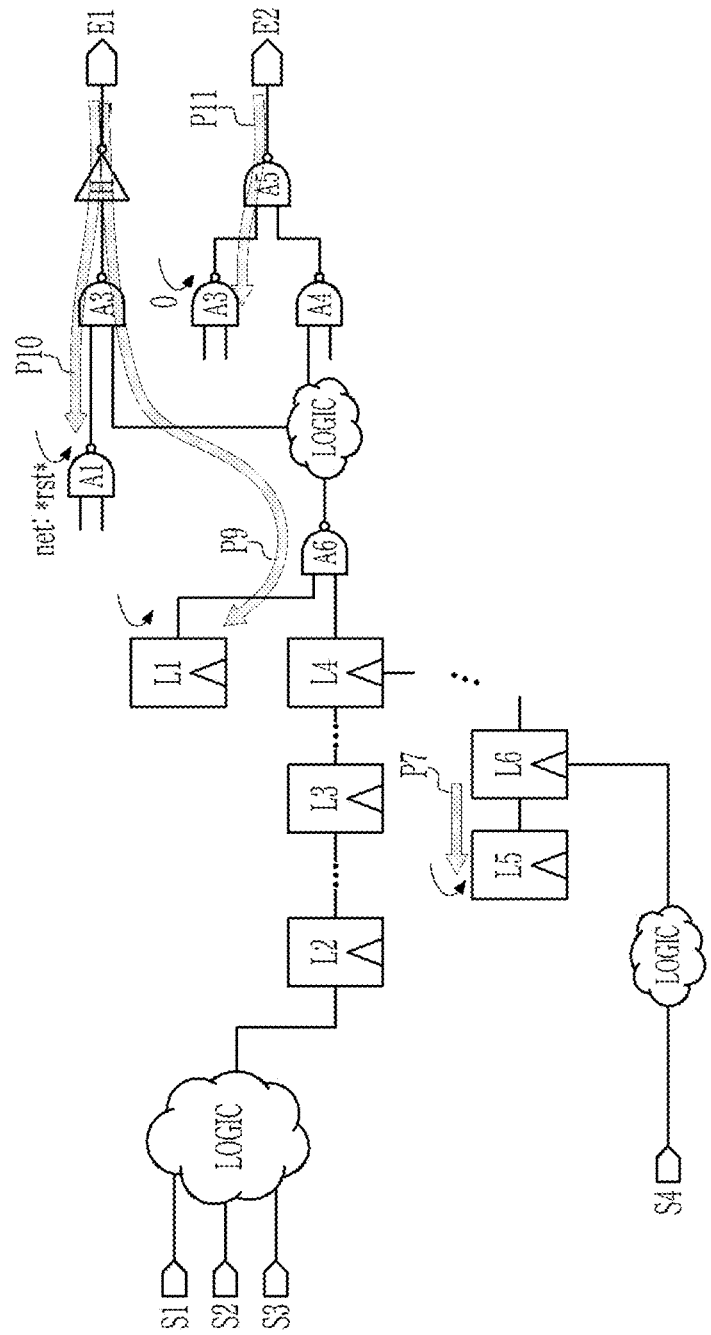
FIG. 7 is a view showing a path excluded from tracing according to an embodiment.

FIG. 7 is a view showing a path excluded from the tracing according to an embodiment. Referring to FIG. 7, the path tracer 230 may determine the path to be excluded from the path tracing based on: (i) the information 530 on the net to be excluded from the path tracing, (ii) the information 540 on the latches in the specified path for performing the timing analysis, and (iii) the bypass latch information 550 of FIG. 5.

For example, if the net (for example, the net whose name includes "rst") to be excluded from the path tracing is encountered, the path tracing to the path P10 may not be performed during the path tracing from the tracing start points E1 and E2. In addition, if the net (for example, the net whose value is fixed to 0 or 1 according to a mode setting) to be excluded from the path tracing is encountered, the path tracing to the path P11 may not be performed during the path tracing from the tracing start points E1 and E2. For example, if the latches L1 and L5 other than the latches L2, L4, and L6 (see 540 of FIG. 5) or the bypass latch L3 (see 550 of FIG. 5) in the specified path are encountered, the path tracing to the paths P9 and P7 may not be performed during the path tracing from the tracing start points E1 and E2.

Figure 8:
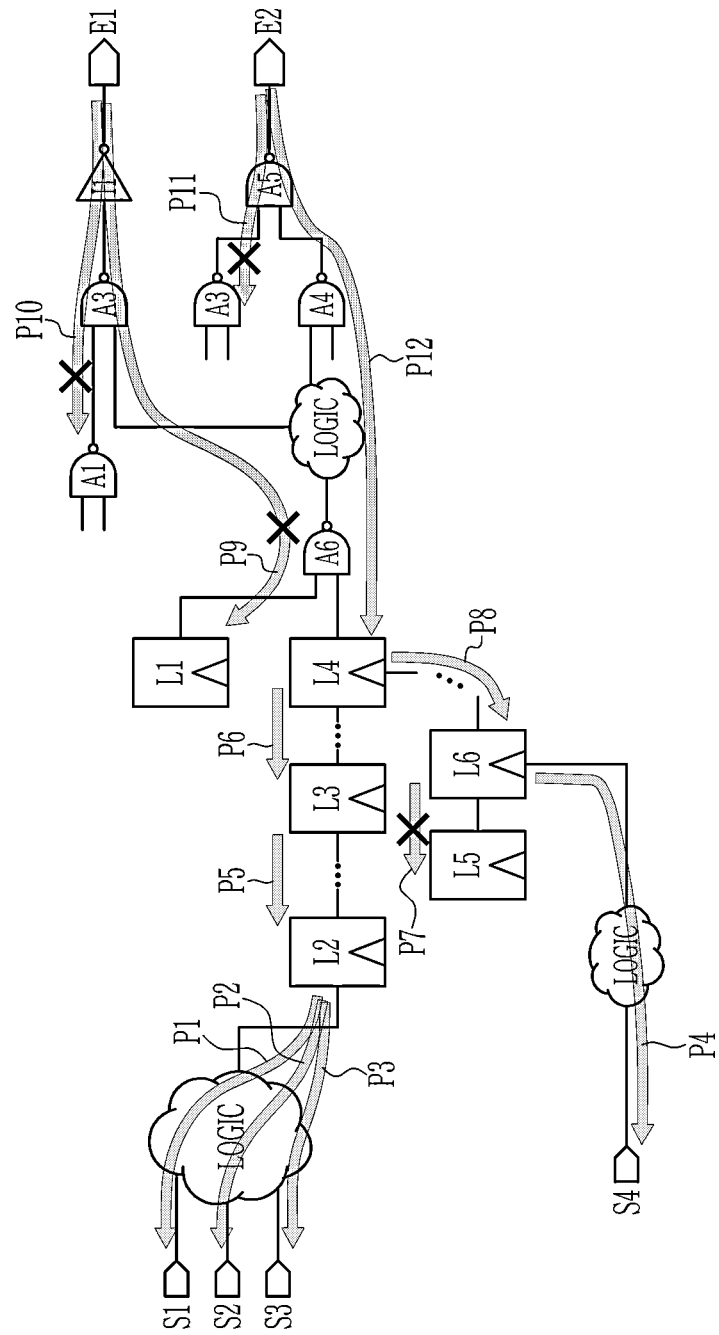
FIG. 8 is a view showing a specified path traced by the path tracer according to an embodiment.

FIG. 8 is a view showing the specified path traced by the path tracer according to an embodiment. Referring to FIG. 8, the path tracer 230 may perform path tracing only on specified paths P1, P2, P3, P4, P5, P6, P8, and P12 among the paths P1 to P12 from the tracing start points E1 and E2 to the tracing end points S1, S2, S3, and S4. In an embodiment, the path tracer 230 may generate a list of only nets in the specified paths P1, P2, P3, P4, P5, P6, P8, and P12 among the paths P1 to P12 from the tracing start points E1 and E2 to the tracing end points S1, S2, S3, and S4.

Figure 9:
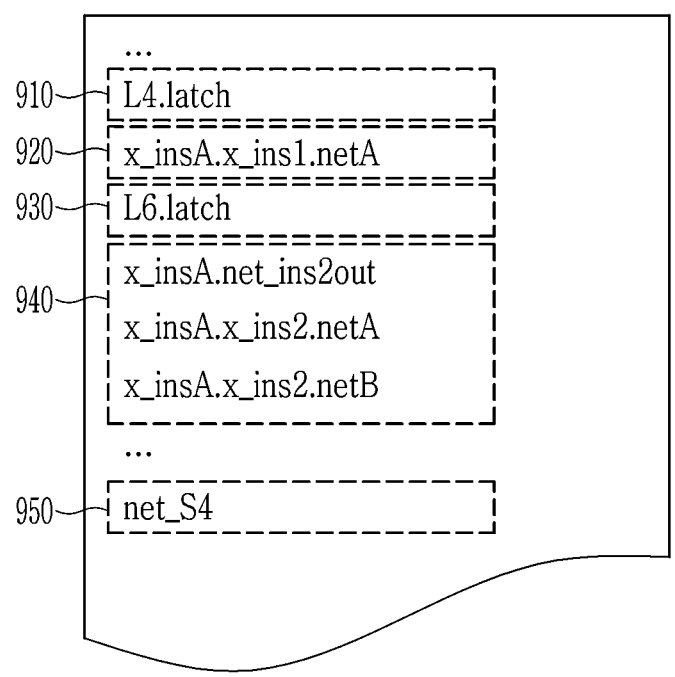
FIG. 9 is a view showing a list file of a net generated by the path tracer according to an embodiment.

FIG. 9 is a view showing a list file of a net generated by the path tracer according to an embodiment. Specifically, FIG. 9 shows the list file 900 of the net that lists names of nets in the specified path and is generated by the path tracer 230 based on the information on the full-chip netlist and the specified path.

In an embodiment, the list file 900 of the net may include information of a net 910 connected to the latch L4 of FIG. 8, a net 920 connected to a logic disposed between the latch L4 and the latch L6, a net 930 connected to the latch L6, a net 940 connected to a logic disposed between the latch L6 and the signal start point S4, and a net 950 connected to the signal start point S4, but the present disclosure is not limited thereto.

Referring again to FIG. 3, in step S340, the design constraints generator 240 of FIG. 2 receives the list file of the net in the specified path from the path tracer 230, and generates a design constraints file for the clock path of the specified path.

Figure 10:
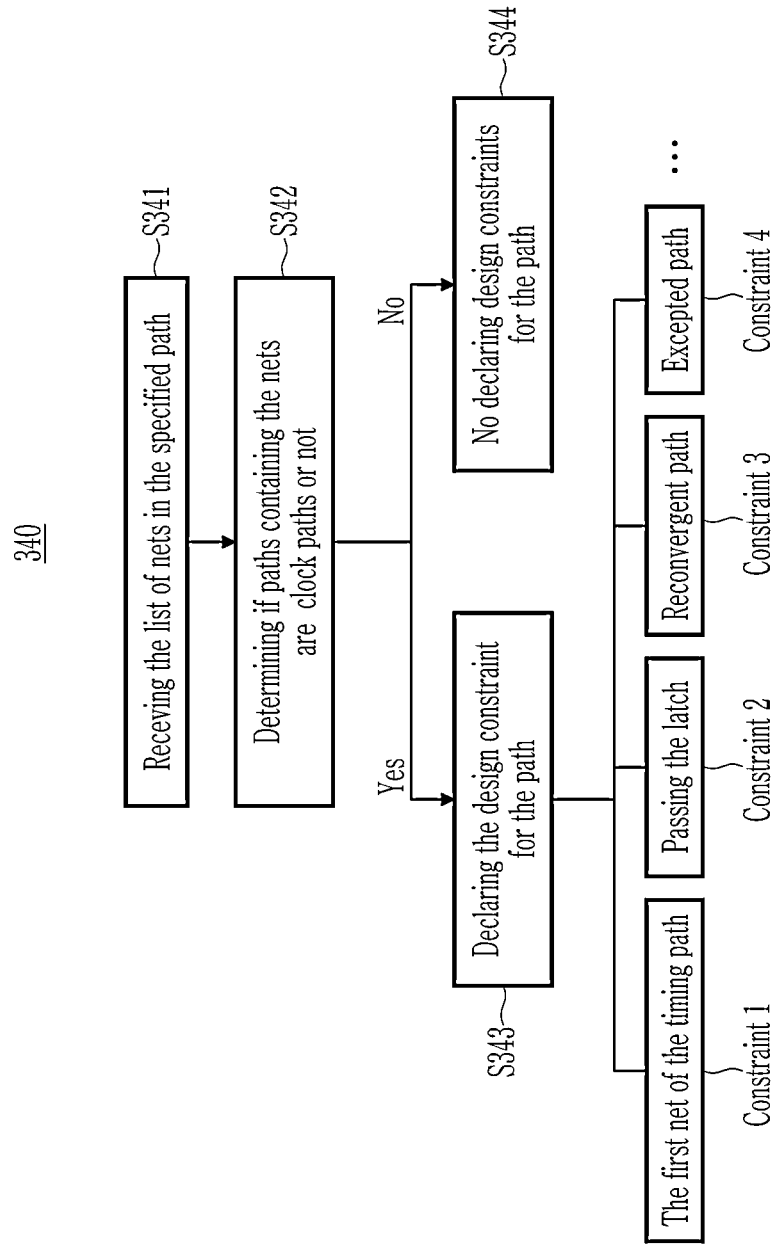
FIG. 10 is a flowchart showing a method for generating a design constraints file according to an embodiment.
Figure 11:
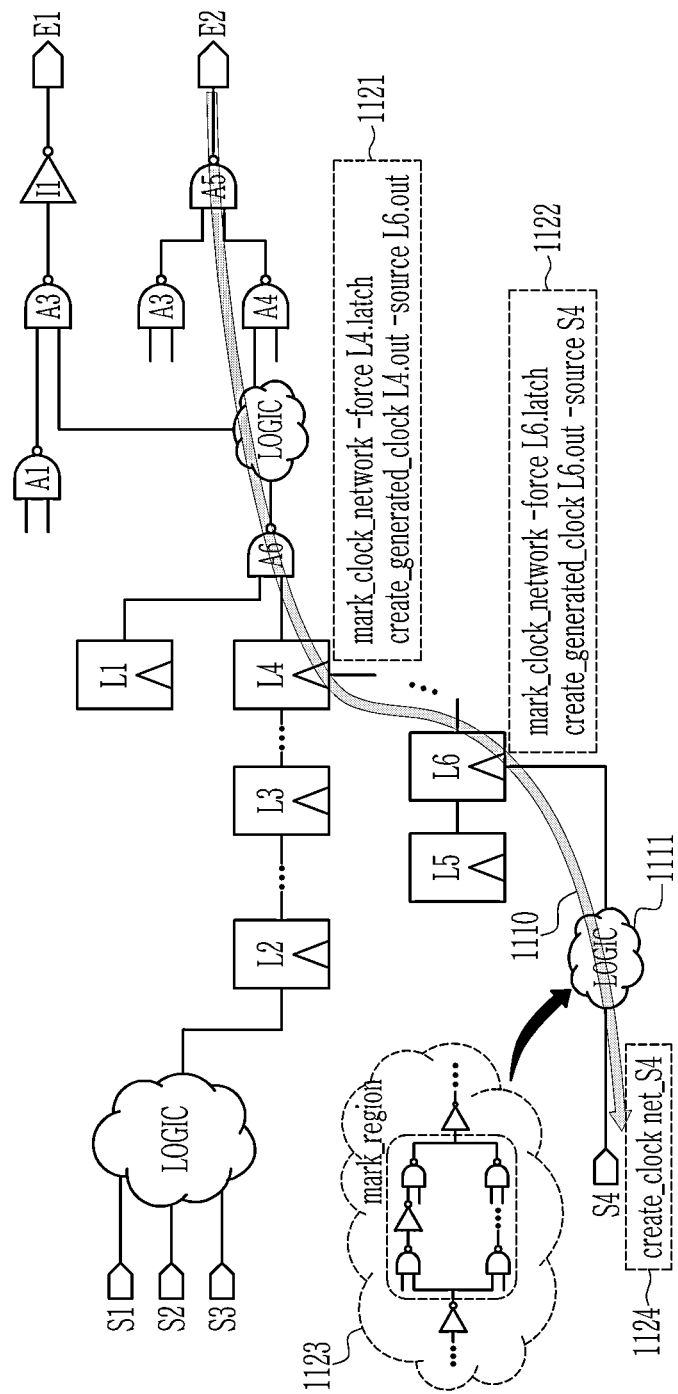
FIG. 11 is a view illustrating design constraints according to an embodiment.
Figure 13:
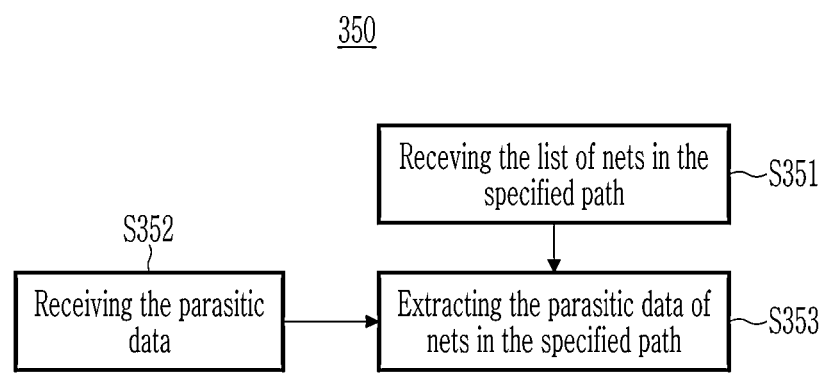
FIG. 13 is a flowchart showing a method for generating parasitic data according to an embodiment.

The step S340 will be described with reference to FIGS. 10 to 12, where FIG. 10 is a flowchart showing a method for generating the design constraints file according to an embodiment, and FIG. 11 is a view illustrating design constraints according to an embodiment. However, the design constraints generated here are required when the static timing analysis (STA) is performed using NanoTime, by Synopsys Inc., but the present disclosure is not limited thereto, and it should be noted that performing the static timing analysis (STA) with another tool may require different design constraints.

In an embodiment, the design constraints generator 240 receives the list of nets in the specified path traced from the signal tracer 230 (S341), and determines whether the path including the net is the clock path (S342). Specifically, if a net included in a timing path within the specified path is connected to a clock pin of the latch, the design constraints generator 240 may determine that the timing path including the net is the clock path. In addition, if a first net in the specified path is connected to the signal start point S4 that outputs the clock signal, the design constraints generator 240 may determine that the path including the net is the clock path. For example, the design constraints generator 240 may extract the first net in the specified path from the list of the nets, may extract the signal start point S4 that outputs the clock signal among the plurality of signal start points S1 to S4, and may extract a path including a net connected to the signal start point S4. In an embodiment, the design constraints generator 240 may extract the clock path in the specified path, and may declare the design constraints for the clock path (S343). In an embodiment, the design constraints generator 240 does not declare the design constraints for a path (that is, the data path) other than the clock path (S344).

The design constraints, constraint 1 to constraint 4 of FIG. 10, will be described with reference to FIG. 11. In an embodiment, the design constraints generator 240 may declare the design constraints (constraint 1) for the net connected to the signal start point that outputs the clock signal among the nets within the clock path. Here, the signal start point that outputs the clock signal may be a clock source. Referring to FIG. 11, the design constraints generator 240 may declare the design constraints indicating that the net connected to the signal start point s4 that outputs the clock signal among the nets within the clock path 1110 is the net that generates the clock signal (1124). In an embodiment, if the clock signal passes through a first latch, the clock signal after the first latch in a signal transfer process may be a clock signal regenerated from the first latch. Therefore, if the clock path passes through the latch, the design constraints generator 240 may declare the design constraints (constraint 2) for indicating that the clock signal is regenerated in the latch. Referring to FIG. 11, if the clock path 1110 passes the latch L6 in the signal transfer process, the design constraints generator 240 may declare the design constraints indicating that the clock signal is regenerated in the latch L6. Additionally, the design constraints generator 240 may declare the design constraints for indicating that the clock signal of the latch L6 is transferred from the clock source S4 (1122). If the clock path 1110 passes through the latch L4 in the signal transfer process, the design constraints generator 240 may declare the design constraints for indicating that the clock signal is regenerated in the latch L4. Additionally, the design constraints generator 240 may declare the design constraints for indicating that the clock signal of the latch L4 is transferred from the latch L6 before the latch L4 (1121).

In an embodiment, when the clock path is a reconvergent path, the design constraints generator 240 may declare the design constraints (constraint 3) for analyzing all nets included in the reconvergent path together. Referring to FIG. 11, if some logic 1111 included in the clock path 1110 includes a path that reconverges after the clock path is divided into two sections, the design constraints generator 240 may declare the design constraints for analyzing all nets included in the reconvergent path together (1123).

In an embodiment, if some of the clock paths are paths excluded from the analysis, the design constraints generator 240 may declare the design constraints (constraints 4) that prevents the timing analysis from being performed on the path. The design constraints declared by the design constraints generator 240 are not limited thereto, and more design constraints may be declared.

FIG. 12 is a view showing the design constraints file generated by the design constraints generator 240 according to an embodiment. Specifically, FIG. 12 shows the file 1200 declaring the design constraints for the clock path based on the list file of the net in the specified path received by the design constraints generator 240 from the path tracer 230. As described in FIG. 11, various design constraints on the clock path 1110 may be declared in the file 1200.

Referring again to FIG. 3, in step S350, the file generator 260 of FIG. 2 generates the parasitic data of the net in the specified path. This step S350 will be described with reference to FIG. 13, which is a flowchart showing a method for generating the parasitic data according to an embodiment.

In an embodiment, the file generator 260 may receive the list of nets in the specified path generated from the path tracer 230 (S351). Additionally, the file generator 260 may receive the parasitic data from the layout data (S352). The parasitic data may refer to the resistor (R) information, the capacitor (C) information, and the like of the net within the integrated circuit.

In an embodiment, the file generator 260 may extract the parasitic data of the net in the specified path from the parasitic data received from the layout data (S353). In this case, the extracted information may include not only the parasitic data of the net in the specified path but also parasitic data of a net that forms a coupling capacitance with the net in the specified path. In addition, the extracted information may include parasitic data of a net (for example, a plurality of nets output from one logic or a plurality of nets input to one logic) logically adjacent to the net in the specified path, but the present disclosure is not limited thereto. In an embodiment, the file generator 260 may generate a parasitic data file of the net in the specified path based on the extracted parasitic data (S350).

In step S360 of FIG. 3, the static timing analyzer 270 of FIG. 2 receives a design constraints file and the parasitic data file for the net in the specified path, and performs the static timing analysis (STA) based on the received design constraints file and parasitic data file.

FIG. 14 is data representing results of performing the path tracer, the design constraints generator, and the file generator according to an embodiment. Specifically, the specified path to be analyzed in the integrated circuit is separated using the path tracer 230, the design constraints is declared using the design constraints generator 240, and the parasitic data file 1400 that is the data representing the results is generated using the file generator 260. Each item of FIG. 14 is as follows.

In an embodiment, the total number of nets in the full-chip netlist of the integrated circuit for data analysis of FIG. 14 is 125, 321, 221. Referring to Case 1, the specified path to be analyzed may have a total of 23 signal start points 1410 and a total of 454 signal end points 1430, and a signal between the signal start point and the signal end point may pass through 1,453 latches 1420. The number of paths 1440 traced by the path tracer between the signal start point and the signal end point is 27,213, and a ratio 1450 of nets within the traced path to the number of entire nets within the full-chip netlist is 0.06%. The design constraints generator 240 declares 107 design constraints 1460 for the nets within the traced path, and a runtime 1470 of the path tracer and the design constraints generator is 238 s. Additionally, a ratio 1480 of the number of transistors within the parasitic data file generated by the file generator 260 to the number of transistors of a full-chip is 3.1%, and a runtime 1490 of the file generator is 369 s. That is, the number of nets for the timing analysis is significantly reduced compared with the entire nets within the full-chip netlist.

Referring to Cases 2 to 8, a ratio 1450 of nets in the specified path for the timing analysis to the entire nets within the full-chip netlist may be less than 1%. In other words, because a block-level static timing analysis is not possible due to a structure of the DRAM and an entire circuit has to be analyzed at one time, the static timing analysis may have a long runtime. However, if the static timing analysis is performed by extracting only the specified path within the integrated circuit, the runtime of the static timing analysis may be advantageously reduced. Therefore, there is an advantage in which a turn-around-time (TAT) for the static timing analysis (STA) may be reduced.

Figure 15:
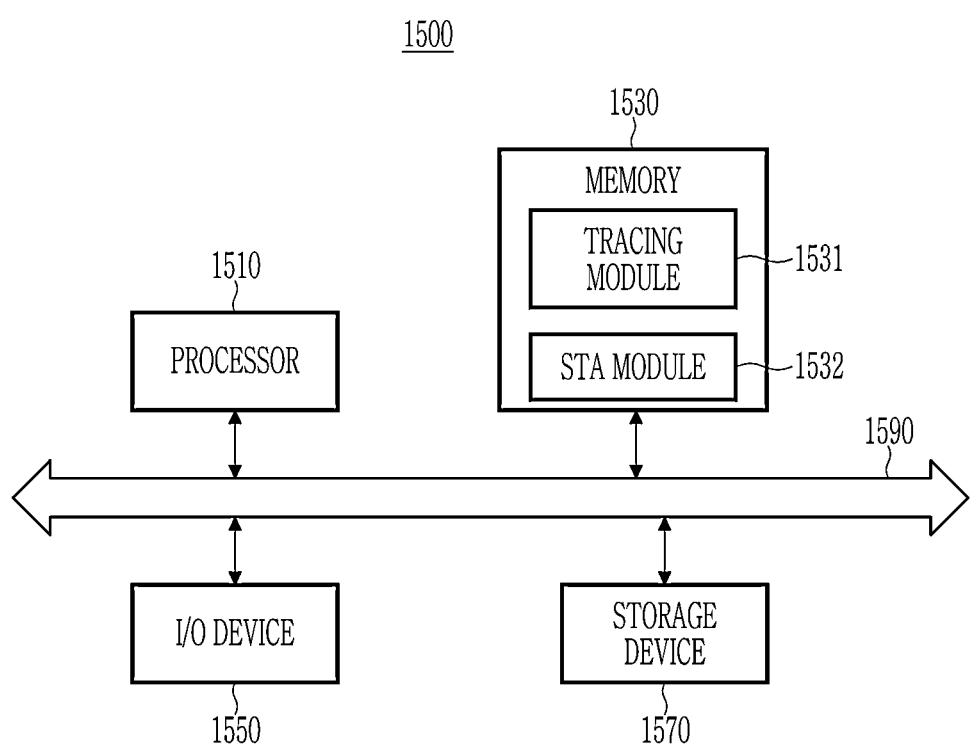
FIG. 15 is a block diagram showing a computing system for designing and verifying the integrated circuit according to an embodiment.

FIG. 15 is a block diagram showing a computing system 1500 for designing and verifying the integrated circuit according to an embodiment of the present disclosure. Referring to FIG. 15, the computing system 1500 for designing and verifying the integrated circuit may include a processor 1510, a memory 1530, an input/output device 1550, a storage device 1570, and a bus 1590. The computing system 1500 may perform a verification operation of the integrated circuit of FIGS. 2 to 13. The computing system 1500 may be provided as a dedicated device for designing and verifying the integrated circuit of a semiconductor device, but may be a computer for driving various simulation tools or design tools.

The processor 1510 may be configured to execute instructions that perform at least one of various operations for designing and verifying the integrated circuit. The processor 1510 may communicate with the memory 1530, the input/output device 1550, and the storage device 1570 through the bus 1590. The processor 1510 may execute a design operation and a verification operation of the integrated circuit by driving a tracing module 1531 and a static timing analysis (STA) module 1532 loaded in the memory 1530.

The memory 1530 may store the tracing module 1531 and the static timing analysis (STA) module 1532. Additionally, the memory 1530 may further store a composition module and a layout module. The tracing module 1531 and the STA module 1532 may be loaded from the storage device 1570 to the memory 1530. The memory 1530 may be a volatile memory such as an SRAM or a DRAM, or a non-volatile memory such as a PRAM, an MRAM, an ReRAM, an FRAM, a NOR flash memory, or the like.

For example, the tracing module 1531 may be a program that includes a plurality of instructions for performing path tracing and file creation according to the operations 220 of FIG. 2 and the step of FIG. 3. For example, the tracing module 1531 may be a program that includes the plurality of instructions for tracing the specified path to be analyzed from a transistor-level netlist according to FIGS. 2 to 13, extracting a list of nets in the specified path, and generating the design constraints and the parasitic data file for the specified path based on the extracted list of nets. For example, the STA module 1533 may be a program that includes a plurality of instructions for receiving the design constraints and the parasitic data file generated according to FIGS. 2 to 13 to perform the static timing analysis (STA) for the specified path.

The input/output device 1550 may control an input and an output of a user from user interface devices. For example, the input/output device 1550 may include an input device such as a keyboard, a mouse, a touchpad, or the like to receive input data defining the integrated circuit. For example, the input/output device 1550 may include an output device such as a display, a speaker, or the like to display a placement result, a routing result, or a timing analysis result. The storage device 1570 may store various data related to the tracing module 1531 and the STA module 1532. The storage device 1570 may include a memory card (an MMC, an eMMC, an SD, a MicroSD, or the like), a solid-state drive (SSD), a hard disk drive (HDD), or the like.

While the embodiment of the present disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A system for verifying an integrated circuit, comprising:
   a tracing module configured to: trace a specified path based on the specified path on which a timing analysis will be performed among a plurality of signal transfer paths within the integrated circuit and a netlist of the integrated circuit at a transistor level, generate a list of nets listing names of nets in the specified path based on the netlist and information on the specified path, declare design constraints for the specified path based on the list of the nets, and generate parasitic data for a net based on the list of the nets; and
   an analysis module configured to perform a timing analysis for the specified path based on the design constraints and the parasitic data.

2. The system of claim 1, wherein the information on the specified path includes: information on at least one signal start point and at least one signal end point of the specified path, information on a path to be excluded from tracing among a plurality of signal transfer paths between the at least one signal start point and the at least one signal end point, and information on at least one memory element that the specified path passes through.

3. The system of claim 2, wherein the specified path includes: a data path connected to a signal start point among the at least one signal start point that is designated to output a data signal, and a clock path connected to a signal start point among the at least one signal start point that is designated to output a clock signal.

4. The system of claim 3, wherein the at least one memory element includes a first pin designated to receive the clock signal, and the clock path includes the net connected to the first pin.

5. The system of claim 4, wherein the design constraints are declared for the clock path among the specified paths.

6. The system of claim 2, wherein the tracing includes extracting a plurality of paths between the at least one signal start point and the at least one signal end point, and excluding a path to be excluded from the tracing among the extracted plurality of paths.

7. The system of claim 6, wherein the tracing is performed in a reverse direction of a signal transfer direction of the plurality of signal transfer paths.

8. The system of claim 7, wherein the plurality of paths are distinguished by the at least one memory element.

9. The system of claim 2, wherein the at least one memory element includes a latch.

10. The system of claim 1, wherein the parasitic data further includes parasitic data for a net that forms a coupling capacitance with the net and a net that is logically adjacent to the net.

11. A method for verifying an integrated circuit, comprising:
    receiving a netlist of an integrated circuit at a transistor-level;
    receiving information on a specified path on which a timing analysis will be performed among a plurality of signal transfer paths within the integrated circuit;
    tracing the specified path and generating a list of nets listing names of nets in the specified path based on the netlist and information on the specified path;
    declaring design constraints for the specified path based on the list of the nets; and
    generating parasitic data for a net in the specified path based on the list of the nets.

12. The method of claim 11, wherein the information on the specified path includes: a name of a net connected to a plurality of signal start points and a plurality of signal end points in the specified path, a name of a net in a path to be excluded from tracing among a plurality of signal transfer paths between the plurality of signal start points and the plurality of signal end points, and a name of a net connected to a memory element through which the specified path passes.

13. The method of claim 12, wherein the tracing of the specified path comprises:
    extracting a plurality of paths from the plurality of signal end points to the plurality of signal start points; and
    excluding at least one path from the tracing among the plurality of paths.

14. The method of claim 13, wherein the plurality of paths are distinguished by the memory element.

15. The method of claim 13, wherein the declaring of the design constraints includes extracting a clock path from the plurality of paths.

16. The method of claim 15, wherein the memory element includes a first pin designated to receive a clock signal, and the clock path is a path connected to the first pin.

17. The method of claim 16, wherein the clock path is a path connected to a signal start point among the plurality of signal start points that is designated to output the clock signal.

18. The method of claim 17, wherein the extracting of the clock path from the plurality of paths comprises:
    extracting at least one net connected to the plurality of signal start points from the list of the nets;

extracting the signal start point among the plurality of signal start points that is designated to output the clock signal; and extracting a path including a net connected to the signal start point that is designated to output the clock signal, among the at least one net.

19. The method of claim 11, wherein the generating of the parasitic data comprises:

receiving the parasitic data from layout data of the integrated circuit; and extracting the parasitic data of the net in the list of the nets from the parasitic data of the integrated circuit.

20. A device for verifying an integrated circuit, comprising:

a path tracer configured to: trace a specified path on which a timing analysis will be performed from among a plurality of signal transfer paths within the integrated circuit at a transistor level, and generate a list of nets listing names of nets in the specified path;

a design constraints generator configured to declare design constraints for the specified path based on the list of the nets; and a file generator configured to generate parasitic data for a net in the list of the nets based on the list of the nets.

* * * * *